(12) United States Patent
Lehn et al.

(10) Patent No.: US 10,707,679 B2
(45) Date of Patent: Jul. 7, 2020

(54) BATTERY ENERGY STORAGE SYSTEM

(71) Applicants: Peter Waldemar Lehn, Toronto (CA); Kyle Muehlegg, Brechin (CA); The Governing Council of the University of Toronto, Toronto (CA)

(72) Inventors: Peter Waldemar Lehn, Toronto (CA); Kyle Muehlegg, Brechin (CA)

( * ) Notice: Subject to any disclaimer, the term of this patent is extended or adjusted under 35 U.S.C. 154(b) by 116 days.

(21) Appl. No.: 16/010,187

(22) Filed: Jun. 15, 2018

(65) Prior Publication Data
US 2018/0366948 A1 Dec. 20, 2018

Related U.S. Application Data

(60) Provisional application No. 62/519,918, filed on Jun. 15, 2017.

(51) Int. Cl.
| | | |
|---|---|---|
| *H02J 1/10* | (2006.01) | |
| *H02J 7/00* | (2006.01) | |
| *H02J 3/38* | (2006.01) | |
| *H02J 1/14* | (2006.01) | |
| *H02J 3/32* | (2006.01) | |
| *H02J 7/35* | (2006.01) | |

(52) U.S. Cl.
CPC .......... *H02J 1/14* (2013.01); *H02J 1/10* (2013.01); *H02J 1/102* (2013.01); *H02J 3/32* (2013.01); *H02J 3/383* (2013.01); *H02J 7/0014* (2013.01); *H02J 7/35* (2013.01); *H02J 1/106* (2020.01)

(58) Field of Classification Search
CPC ...... H02J 1/10; H02J 1/102; H02J 1/14; H02J 3/32; H02J 3/38; H02J 3/381; H02J 3/382; H02J 3/383; H02J 7/0014; H02J 7/35; H02J 2001/106; H02J 1/106
USPC ......................................................... 307/20
See application file for complete search history.

(56) References Cited

PUBLICATIONS

Bhavsar, Yogesh S. et al., "Energy Management in DC Microgrid"; 2015 International Conference on Energy Systems and Applications (ICESA-2015); pp. 209-213, (978-1-4673-6817-9/15/$31.00 2015 IEEE).
Alfred Engler, Nikos Soultanis, "Droop Control in LV-Grids", pp. 1-3.
Rui Hu and Wayne W. Weaver, "DC Microgrid Droop Control Based on Battery State of Charge Balancing", (978-1-5090-0261-0/16/$31.00 2016 IEEE).
Youichi Ito et al.; "DC Micro-grid Based Distribution Power Generation System", pp. 1740-1745.
Hyun-Jun Kim et al., "Operation Analysis of Stand-alone DC Micro-grid with Coordinated Droop Control", pp. 692-698, (978-1-4799-0482-2/13/$31.00 2013 IEEE).

(Continued)

*Primary Examiner* — Hal Kaplan
(74) *Attorney, Agent, or Firm* — Head, Johnson, Kachigian & Wilkinson, PC (57) ABSTRACT

An improved method for sharing power between multiple battery energy storage systems (BESS) connected to a common DC network having a nominal voltage wherein the current from each BESS is regulated based upon a voltage-current characteristic which defines an output current which increases linearly in a predetermined ratio as the measured system voltage decreases. The predetermined ratio is constant in respect of each BESS. The output current of each BESS varies based upon an external signal that varies with the state of charge of the BESS.

4 Claims, 8 Drawing Sheets

Droop Curve Adjustment for Energy Management Scheme (56) References Cited

PUBLICATIONS

Sneha Mane, et al., "Optimal Load Balancing Strategy for Hybrid Energy Management System in DC Microgrid with PV, Fuel Cell and Battery Storage", 5th International Conference on Renewable Energy Research an Applications, Nov. 20-23, 2016, Birmingham, UK, ICRERA 2016, pp. 851-856.

Wayne Panboa, et al., "An Autonomous Control Scheme for DC Micro-Grid System", pp. 1519-1523, (978-1-4799-0224-8/8/13/$31 2013 IEEE).

Gaurav Pandey, et al., "Protection and Energy Management of Zero Net Electric Energy Clusters of Buildings", (978-1-4673-8597-8/15/$31.00 2015 IEEE).

Charles K. Sao, et al., "Autonomous Load Sharing of Voltage Source Converters", IEEE Transactions on Power Delivery, vol. 20, No. 2, Apr. 2005, pp. 1009-1016 (0885-8977/$20.00 2005 IEEE).

Bernd Wunder, et al., "Voltage Control and Stabilization of Distributed and Centralized DC Micro Grids", PCIM Europe 2015, May 19-21, 2015 Nuremberg, Germany, pp. 660-667 (ISBN 978-3-8007-3924-0).

J. Duncan Glover, et al.; "Power System Analysis and Design", Fourth Edition, 2008.

Hydro One Networks Inc.; In the Matter of an Application for Electricity Distribution Rates 2006, Decision with Reasons Apr. 12, 20016, Ontario Energy Board, RP-2005-0020, EB-2005-0378.

BAL-001-TRE:1—Primary Frequency Response in the ERCOT Region, pp. 1-49.

Prabha Kundur, "Power System Stability and Control", Electric Power Research Institute, Power System Engineering Series, 1994.

Fig. 1. Droop Curve Characteristic for AC Microgrid Systems, for P/f & Q/V Droop Fig. 2. AC System w/ Common Bus Fig. 3. Mechanical Power vs. Frequency for Two Turbines w/ Different Characteristics [3]

Fig. 4. System Bus Voltage vs. Output Current for DC Microgrid

Fig. 5. General Control Scheme for the Energy Management Method

Fig. 6. Droop Curve Adjustment for Energy Management Scheme

Fig. 7. Implemented Droop Adjustment Curve

Fig. 8. Droop Curves for SOC = 0%, 80%, 100%

Fig. 9. Aggregate Droop Curve of DC Microgrid w/ Three BESS at SOC = 0%, 80%, 100%, where $I_{base}^{agg} = \sum_{k=1}^{n} I_{base,k}$ Fig. 10. Aggregate Droop Curve of DC Microgrid w/ Three BESS at SOC = 0%, 80%, 100% and the Limiter, where $i_{base}^{agg} = \sum_{k=3} i_{base,k}$ Fig. 11. Aggregate Droop Curve of DC Microgrid w/ Incorporation of the BESS Current Limits Fig. 12. DC Micro-Grid System to Validate Energy Management System Fig. 13. Energy Management Simulation Results; Top to Bottom: SOC of Battery 1 & 2, Bus Voltage, Total Renewable Generation Source and Battery Output Current, Output Current for Battery Converter 1 & 2

Fig. 14. Energy Management Test Scenario 2 Simulation Results: Output Current for Individual BESSs Fig. 15. BESS Controller w/ Sensor Offset Correction Added

BATTERY ENERGY STORAGE SYSTEM

CROSS-REFERENCE TO RELATED APPLICATION

This application claims the benefit of U.S. Provisional Patent Application Ser. No. 62/519,918, filed Jun. 15, 2017 and entitled AUTONOMOUS ENERGY MANAGEMENT METHOD FOR DC MICROGRID SYSTEMS.

BACKGROUND OF THE INVENTION

1 Field of the Invention

The present invention relates to a battery energy storage system (BESS) high-level energy management method.

2. Prior Art

Previous studies have utilized droop control to achieve other objectives. This subsection highlights these studies.

Droop Control in Low Voltage AC Microgrids

Figure 1:
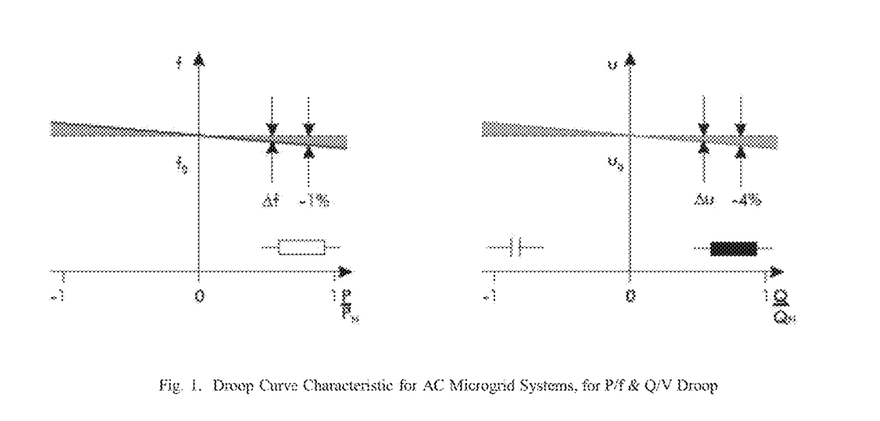
FIG. 1 is a graph illustrating the droop curve characteristics for AC microgrid systems (P/f & Q, V)

Droop control is a common method for energy management in AC microgrids since data can be communicated by signals that are locally measurable. In a study, Engler notes that, if the inverters set their instantaneous active and reactive power, then droop can be utilized to provide power control [1]. Specifically, Engler relates active and reactive power to inverter output frequency and voltage and compares both pairings (P/f, Q/V & P/V, Q/f). This is visually explained in FIG. 1. Engler observed that, for low-voltage grids, "conventional droop," where frequency reference drops or "droops" with increasing power while voltage reference droops with increasing power (P/f, Q/V), can provide active power dispatch and is compatible with generators and high-voltage systems. "Opposite droop" (P/V, Q/f) is capable of providing direct voltage control for low-voltage grids. These are outlined in Table I. Engler therefore concludes, based on the objectives of the system, droop can be utilized to control different parameters.

TABLE I

COMPARISON OF DROOP CONCEPTS
FOR THE LOW VOLTAGE LEVEL [1]

|  | Conventional Droop | Opposite Droop |
| --- | --- | --- |
| Compatible with HV-level | yes | no |
| Compatible with generators | yes | no |
| Direct voltage control | no | yes |

Autonomous Load Sharing of Voltage Source Converters (VSC)

Sao utilized the conventional droop discussed previously to conduct load sharing for multiple VSCs [2]. Conceptually, grids have a bus that is common among all connected components, which can be used as a communication signal. By utilizing this potential communication signal, autonomous methods such as load sharing can be provided to a system.

Figure 2:
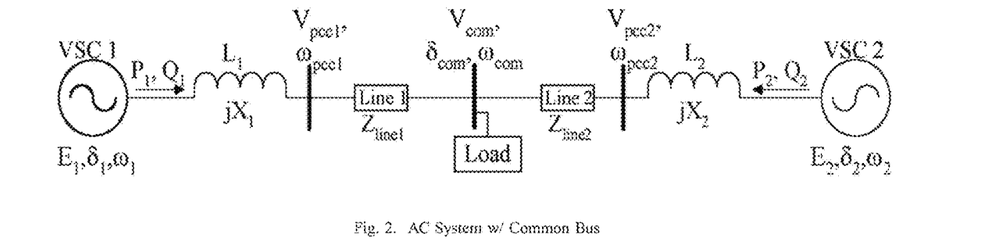
FIG. 2 is a high-level circuit diagram for an AC system with a common bus.

For a system such as FIG. 2, initial conditions and plant parameters can introduce a mismatch in active and reactive power supplied by each VSC. Sao proposes altering the frequency of the VSC individually to alter the phase angle between it and the common bus, which adjusts the active power using (1). By adjusting the VSC frequency reference individually, the provided active power changes until both are balanced.

$$P_x = \frac{E_x V_{com} \sin(\delta_x - \delta_{com})}{X_x} \tag{1}$$

To balance reactive power, Sao proposes altering the reference bus voltage for individual VSCs. This is done through the relationship between reactive power and the difference in magnitude between the VSC and the common bus, which is expressed by (2). By adjusting the reference VSC voltage, the common bus voltage adjusts until the reactive power is balanced.

$$Q_x = \frac{E_x^2 - E_x V_{com} \cos(\delta_x - \delta_{com})}{X_x} \tag{2}$$

Turbine-Governor Control & Automatic Generation Control

Turbine generators' power and frequency have a similar relationship to that of the droop characteristic. Specially, they experience a linear frequency change that is related to the system load and its own rating. Given an external power reference demand, the relationship between mechanical power and generator frequency is provided by (3) [3]. Note that R is a constant that is based on the turbine parameters.

$$P_m = P_{ref} - \frac{1}{R}f \tag{3}$$

Figure 3:
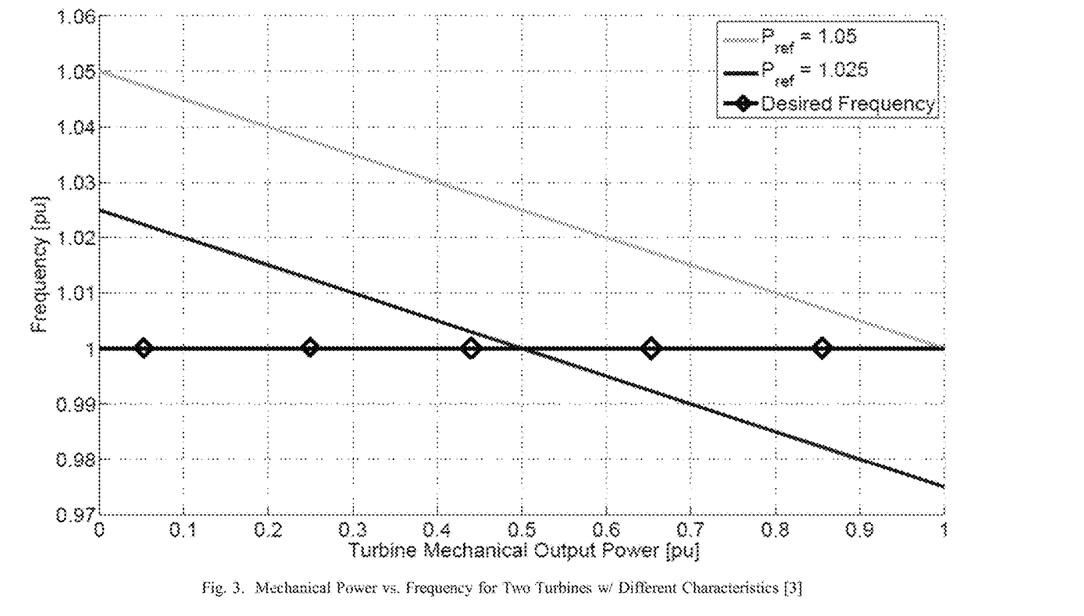
FIG. 3 is a graph that characterizes a turbine generator mechanical power vs. frequency.

If two generators are interconnected to supply a load and their characteristics are different, a power imbalance is introduced. This is due to the interconnection of the two turbines forcing the frequency to match. For this system, $P_{ref}$ is the power reference setting that the user provides based on the load demand. Since the power reference ($P_{ref}$) is externally defined, it can be altered to change the power provided to the load while maintaining a desired system frequency. This is illustrated in FIG. 3.

To maintain the desired frequency, Kundur proposes utilizing an integral control to adjust $P_{ref}$ [4]. This is provided by (4).

$$P_{ref} = \frac{K_i}{s}(\Delta w) \tag{4}$$

Where:

$$\Delta w = w_{ref} - w_{meas} \tag{5}$$

This is also commonly referred to frequency restoration since, over time, it maintains a specific frequency irrespective of load. Since the curve produced by the turbine matches a typical droop characteristic, this concept provides some guidance to DC microgrid power sharing.

Power Sharing in DC Systems: Energy Storage and
Grid-Connected Inverter

Figure 4:
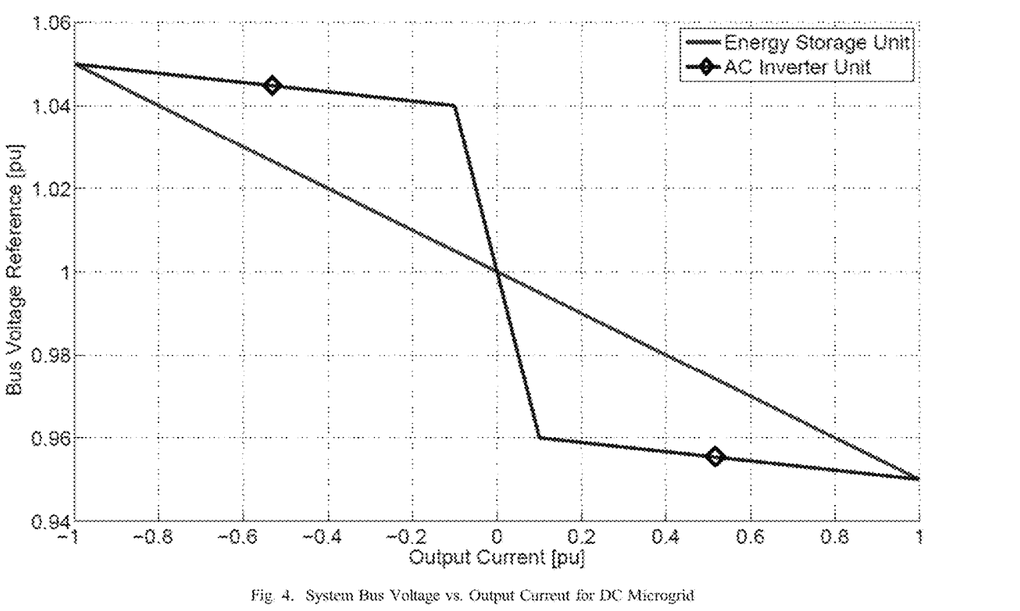
FIG. 4 is a droop characteristic that Akagi proposed to conduct power sharing between an AC inverter and an ESS.

Akagi utilized droop control to provide power sharing in a DC microgrid [5]. Akagi's system consisted of a battery energy storage system (BESS) and a grid-tied inverter to reliably provide power to the microgrid. In his paper, Akagi proposes a piecewise linear function to relate the microgrid's bus voltage to the output current of each supply. This is illustrated in FIG. 4.

At low current demands, the energy storage unit supplies more power than the inverter to increase microgrid independence. At high current demands, however, the inverter begins to supply more power since the energy storage unit is approaching its rated limit. In conclusion, Akagi defines the droop characteristic with different slopes to alter power demand from individual units.

SUMMARY OF THE INVENTION

The present invention proposes an energy management method that utilizes DC voltage signaling to provide indirect communication between local controllers, to provide battery state-of-charge balancing, overcharge protection and undercharge that incorporates variable battery and generation source current limiters. Furthermore, this method is capable of providing offset correction to account for several factors such as, but not limited to, sensor errors, line losses and battery cost optimization.

BRIEF DESCRIPTION OF THE DRAWINGS

Figures and embodiments will be described, by way of example, with reference to the accompanying drawings, in which.

DETAILED DESCRIPTION OF THE PREFERRED EMBODIMENTS

The embodiments discussed herein are merely illustrative of specific manners in which to make and use the invention and are not to be interpreted as limiting the scope.

While the invention has been described with a certain degree of particularity, it is to be noted that many modifications may be made in the details of the invention's construction and the arrangement of its components without departing from the scope of this disclosure. It is understood that the invention is not limited to the embodiments set forth herein for purposes of exemplification.

The effects of greenhouse gases (GHG) have generated an interest in DC microgrid research due to its ability to integrate renewable energy sources and provide storage to existing grid infrastructure. Larger systems typically have multiple energy storage mediums and generation sources integrated into the microgrid. Such systems require an energy management method to ensure proper functionality under all conditions.

For microgrid systems, energy management includes:
1) Battery Energy Storage System (BESS) State-of-Charge (SOC) Balancing
2) Battery Overcharge Protection (OCP)
3) Load Shedding When Demand Exceeds System Ratings
4) Battery Uncharge Protection (UCP)

Past studies have used supervisory-level controllers to detect and correct these scenarios [6]-[7]. This requires direct communication between multiple local controllers and the supervisory control, which introduces time delays and additional communication equipment to provide functionality. These limitations can be overcome with an autonomous energy management method that requires no fast acting communication between local controllers.

One such method is to utilize droop control to modify the microgrid bus voltage. This method allows local controllers to determine the state of the system without direct communication. The general formulation of the curve is:

$$V_{bus}^{ref} = C_{bus}^{nom} - K_d i_{out} \quad (6)$$

Where:
$V_{bus}^{ref}$—Bus Voltage Reference for Local Controller
$V_{bus}^{nom}$—Nominal Bus Voltage
$K_d$—Virtual Resistance
$i_{out}$—Converter Output Current By adjusting the parameters of the droop curve then defining specific voltage ranges to represent system states, energy management can be conducted. Previous studies have utilized this method [8]-[12]. However, the existing studies are not capable of providing all the energy management functions listed previously. Additionally, altering the virtual resistance ($K_d$) affects the eigenvalues of the system, which introduces potential stability issues and limit system scalability. Therefore, a method to indirectly handle all energy management requirements while reducing the effect on stability has the potential to be implemented on all DC microgrid systems.

Energy Management Method

Figure 5:
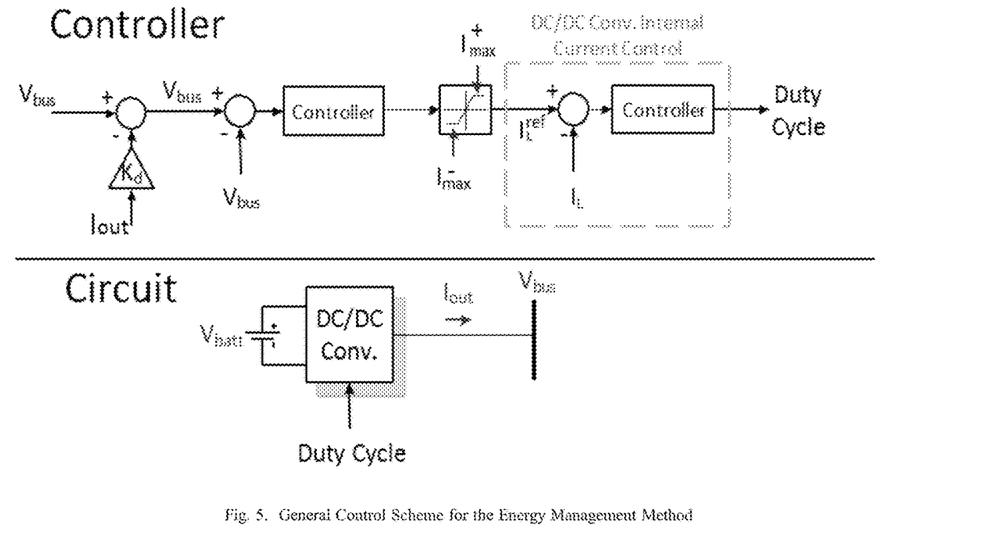
FIG. 5 is a general control scheme for a BESS DC/DC converter.

This section outlines the energy management method that provides the requirements discussed, which are:
1) Battery Energy Storage System (BESS) State-of-Charge (SOC) Balancing
2) Battery Overcharge Protection (OCP)
3) Load Shedding When Demand Exceeds System Ratings The general control scheme for the energy management method is provided in FIG. 5. For this patent, both $I^-_{max}$ and $I^+_{max}$ are dynamically adjustable based on pre-defined parameters (i.e. BESS SOC).

Figure 6:
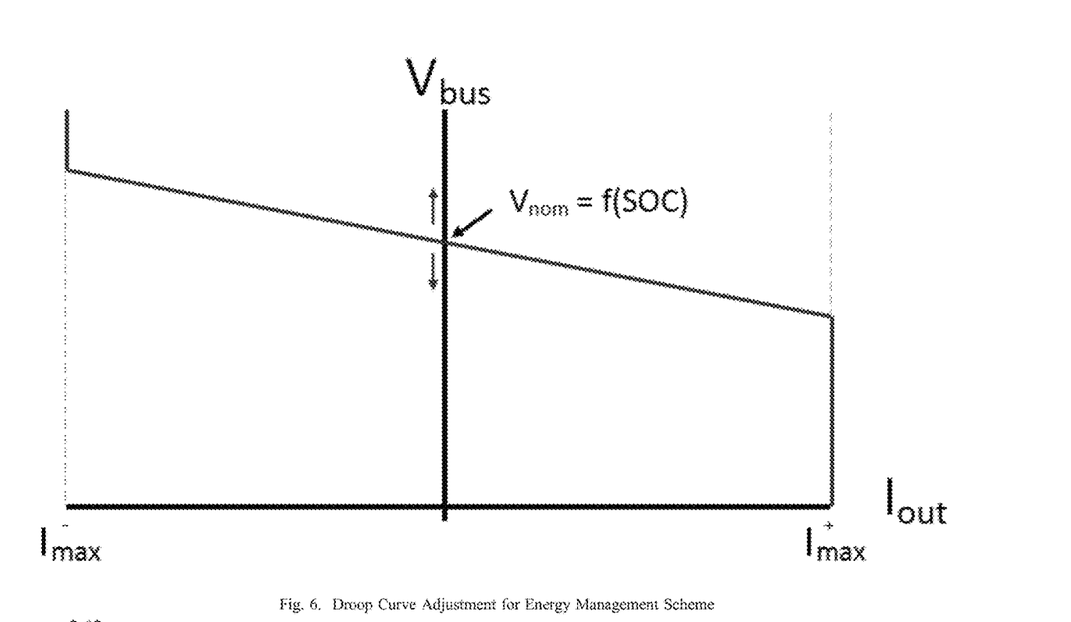
FIG. 6 is a high-level droop concept for the energy management method.

Conceptually, the method utilizes the droop characteristic set by the BESS. Specifically, the V-I curve of the droop characteristic's y-intercept becomes a function of SOC. The slope of the droop characteristic will remain unchanged to prevent eigenvalues from changing based on the SOC. This is illustrated in FIG. 6. It is important to note that each BESS defines its droop curve based the SOC of the battery connected to it.

The main advantage of this design is that there is no direct communication required between converters to implement energy management amongst the batteries. Instead, each converter measures the bus voltage to interpret the state of the system. This allows the local controllers to adjust without the need to wait for information from a system supervisory control. Therefore, this method offers a cost-effective method to implement an indirect-communication energy management that responds quickly and has reduced effect on stability.

Droop Curve Per-Unitization

To discuss the details of the energy management method, it is beneficial to define the droop curve of each converter on a normalized per-unit basis. The droop curve is defined by (7).

$$V_{ref} = V_{nom} - K_d I_{out} \quad (7)$$

Both the voltage and current can be defined in per-unit by (8) and (9).

$$V_{pu} = \frac{V}{V_{base}} \quad (8)$$

$$I_{pu} = \frac{I}{I_{base}} \quad (9)$$

By substituting (8) and (9) into (7), the per-unit equation of the droop curve is described by (10).

$$V_{ref}^{pu} V_{base} = V_{nom}^{pu} V_{base} - K_d I_{out}^{pu} I_{base} \quad (10)$$

From here, the goal is to define the droop curve's slope in per-unit. This can be done by dividing both sides of (10) by $V_{base}$. In doing so, the droop curve slope ($K_d^{pu}$) is defined by (11).

$$K_d^{pu} = K_d \frac{I_{base}}{V_{base}} \quad (11)$$

Therefore, the new per-unit droop characteristic is defined by (12). Each converter has its own unique base values, $V_{base}$ and $I_{base}$, which are determined by the power rating of the associated converter. For the sake of simplicity, assume that each converter has the same base voltage and current.

$$V_{ref}^{pu} = V_{nom}^{pu} - K_d^{pu} I_{out}^{pu} \quad (12)$$

For the example system, the base values for the converter are given in Table II.

TABLE II

SYSTEM PER-UNIT BASE VALUES

| Parameter | Symbol | Value |
| --- | --- | --- |
| Base Voltage | $V_{base}$ | 380 V |
| Base Current | $I_{base, k}$ | 40 A |

Droop Curve Adjustment

This subsection will discuss how the droop curve is adjusted to provide state-of-charge (SOC) balancing of the BESS, overcharge protection (OCP) and load shedding. For ease of understanding, the adjustment curve is provided first, then how it provides each requirement in the energy management system is discussed individually.

Figure 7:
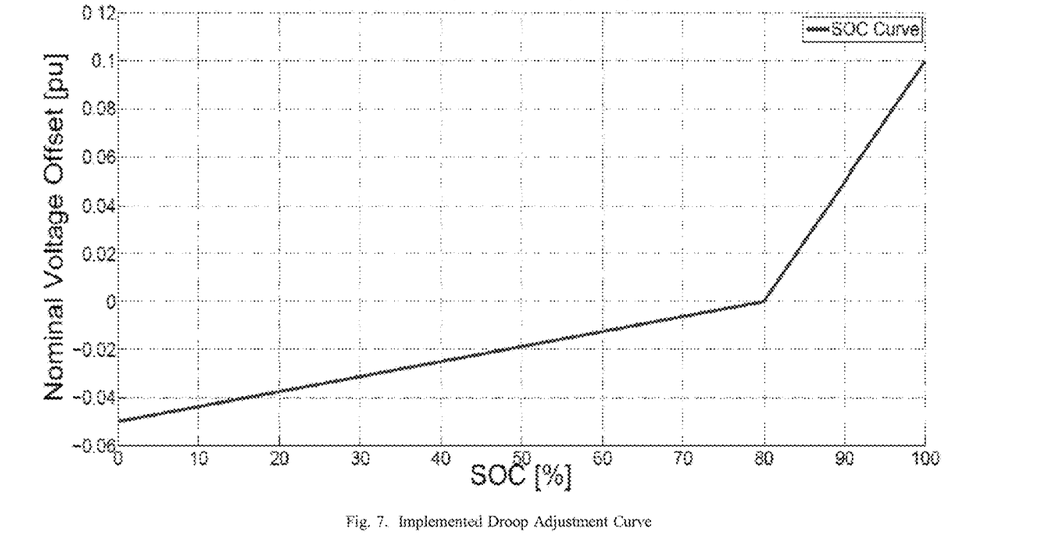
FIG. 7 is a graph that highlights an example droop offset curve for the method.

The nominal voltage of the droop curve ($V_{nom}^{pu}$) is a non-linear adjustment based on the SOC of the local BESS. This is illustrated by FIG. 7. In this example, for SOC>80%, the nominal voltage rises considerably quicker than at lower SOCs and the non-linear adjustment happens to be piecewise linear. This is beneficial for OCP, which is explained in more detail later in the section. In general, the shape of the non-linear adjustment curve would depend on battery characteristics, amongst other variables.

The droop characteristic used in the example system is outlined in Table III. Note that the 5% droop slope is based off the NERC BAL-001-TRE-1 standard [13], which is used for AC power systems. Using these values, the droop curve for various SOCs take on the form shown in FIG. 8. The significant SOC values are highlighted (0%, 80%, 100%).

TABLE III

DROOP CURVE VALUES

| Parameter | Symbol | Per-Unit Value |
| --- | --- | --- |
| Nominal Voltage | $V_{nom}^{pu}$ | 1 |
| Droop Slope | $K_d^{pu}$ | 0.05 |

Figure 8:
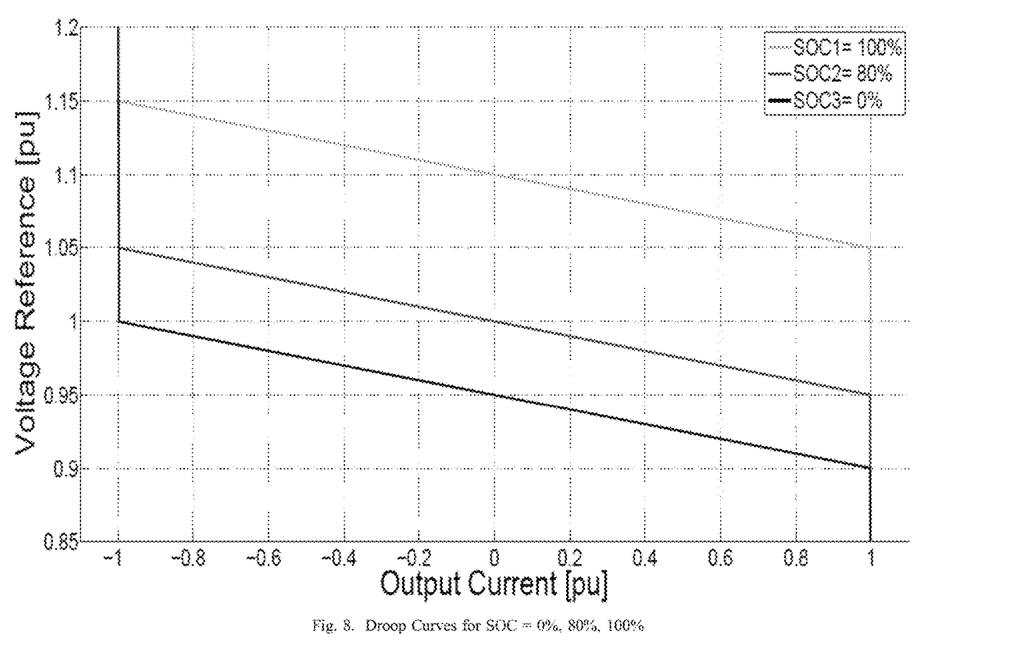
FIG. 8 illustrates the droop curves for 0%, 80% and 100% SOC.
Figure 9:
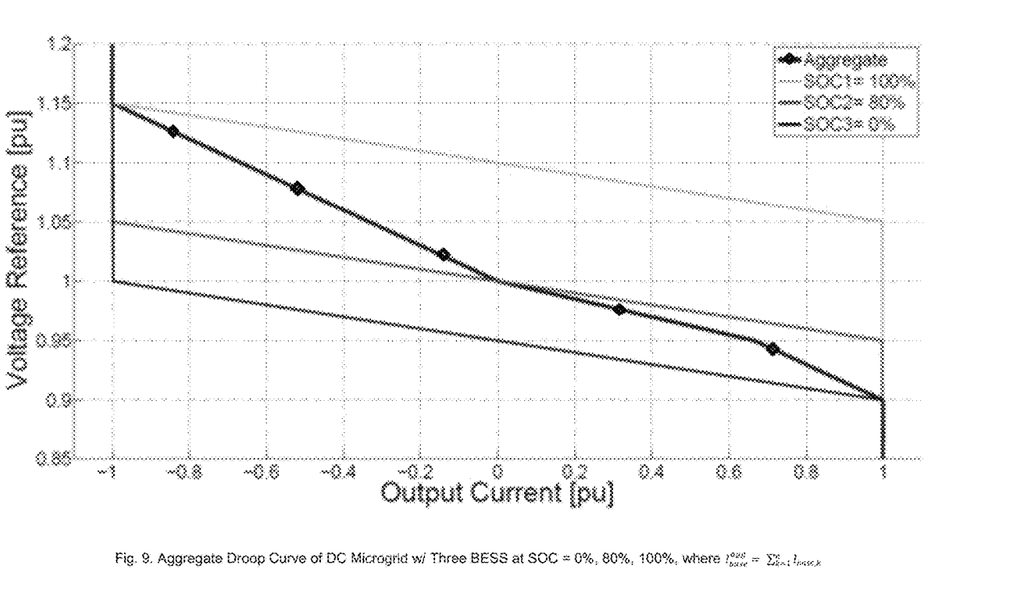
FIG. 9 illustrates the aggregate droop curve for three BESS w/0%, 80% and 100% SOC.

As expected, there is a significant rise between SOC=80% and SOC=100%. Suppose that these three curves represented three unique BESS in the system. Assuming no line losses, all BESSs have the same output voltage during steady-state operation. This phenomenon results in SOC balancing. To further illustrate this, FIG. 8 is expanded on by adding the aggregate droop curve. This aggregate curve represents how the microgrid bus voltage varies based on the output current of all BESSs. Intuitively, the aggregate curve is piecewise linear since the current limiter does not allow individual converters to exceed its rated output. This is provided by FIG. 9. Since the aggregate is for all converters, the current base for that curve is altered. The aggregate curve base is defined in (13).

$$I_{base}^{agg} = \sum_{k=1}^{n} I_{base,k} \quad (13)$$

The aggregate curve in FIG. 9 states that, for a no load scenario, $V_{bus}^{ref} = 1[pu]$. Based on the bus curve, the output current for each converter is highlighted in Table IV.

TABLE IV

INDIVIDUAL BESS OUTPUT
CURRENT FOR $V_{bus}^{ref} = 1$ [PU]

| Battery No. | SOC Value [%] | Base Current | Output Current @ No Load [pu] |
|---|---|---|---|
| 1 | 100 | $i_{base, i}$ | 1 |
| 2 | 80 | $i_{base, i}$ | 0 |
| 3 | 0 | $i_{base, i}$ | −1 |

Since there is no load on the system, the output current of BESS 1 is providing rated power to BESS 3, while BESS 2 outputs no current, resulting in no net output current (no load). This continues until $SOC_1 = SOC_2 = SOC_3$. At that point, all BESS droop curves are identical and SOC balancing is achieved.

There are two important ramifications to observe at this point:
1) At high negative currents (−1 to −0.7 pu), the bus voltage exceeds 1.1 [pu], which is here taken as the maximum permissible bus voltage.
2) At high SOCs, the BESS has the ability to receive rated current.

These introduce a risk, since the system is rated to handle a maximum bus voltage here of 1.1 [pu]. Additionally, since the BESS can still receive rated power at high SOC, the batteries could potentially be overcharged and permanently damaged. At high SOC, many batteries cannot be charged with a constant current. Therefore, an overcharge protection (OCP) method is needed to ensure the safety of the BESS.

Figure 10:
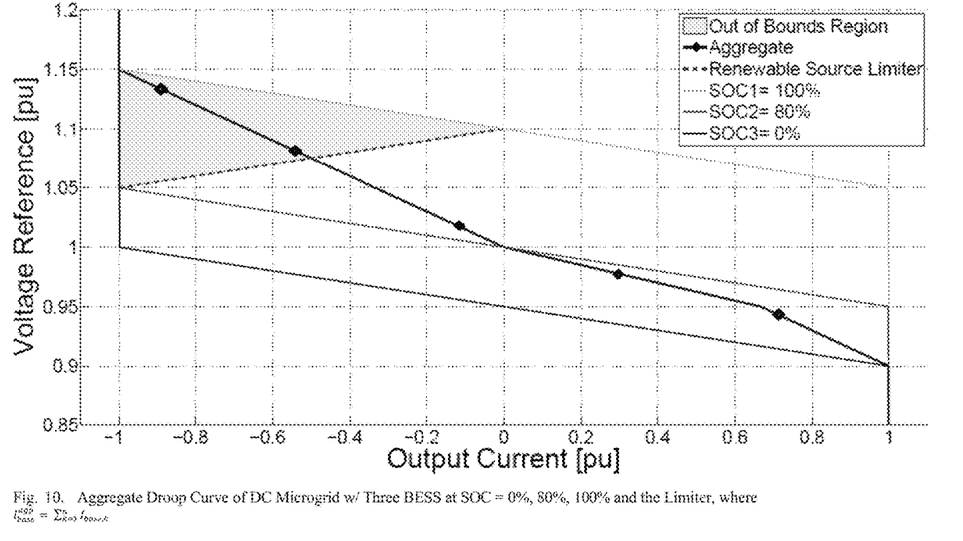
FIG. 10 illustrates the OCP current limiter and how it functions with the method.

This protection can be provided via a generation source limiter. The goal of the OCP scheme is to steadily reduce the maximum output power of the sources until all battery's SOCs are at 100%. Once this is achieved, the generation sources halt power production until a load demand occurs. This is illustrated by FIG. 10. It is important to note that the base for the renewable source limiter is the same base as the aggregate BESS curve, which implies that the generation source and BESSs are rated for equal power. That is not necessary for OCP and is chosen to simplify the explanation. To implement OCP, the generation source measures the bus voltage and reduces its own maximum current based on the dashed line. At $V_{bus}^{ref} = 1.1$ pu, that maximum current is set to zero. Therefore, the system cannot enter the grey region.

An observation can be made that, if all the BESS are below SOC=80%, then the renewable source's maximum permissible power (or current) will always remain at its rated value. On the other hand, if any of the BESS exceed 80%, then maximum permissible power can potentially decrease depending on the system load. Therefore, the region between $1.05 < V_{bus}^{ref} < 1.1$ can be defined as the OCP region.

Another observation is that, if all the BESS are fully charged and a load is introduced, the maximum power that the renewable generation source can provide is increased. Therefore, if the BESSs are discharging, the renewable generation source attempts to provide a portion of the load demand depending on the loading conditions of the system.

The final requirement is system load shedding. If the loads demand power that exceeds the BESS and renewable generation source's capabilities, the system bus voltage collapses. However, the energy management method is capable of preventing this. The acceptable bus voltage operating range is here assumed to be $0.9 < V_{bus} < 1.1$. Therefore, if a load occurs beyond the system's capabilities, the bus voltage reduces below 0.9 pu. When this occurs for a time scale that exceeds normal transient times, selected loads are tripped off-line based on a priority basis, consistent with standard practice in AC power systems, until the load is under the system's power rating. Using this method, load shedding can be achieved. Therefore, this energy management method is capable of providing all requirements mentioned at the beginning of the chapter.

Incorporation of BESS Current Limits

The above sections describe energy management under the assumption that the BESS can always supply current up to a fixed maximum and minimum current level ($I^+_{max}$ and $I^-_{max}$). In practice, the BESS contains its own battery management system (BMS) which has authority to impose output current limits. This is readily accommodated by allowing the battery EMS to reduce $I^+_{max}$ and/or $I^-_{max}$ from its nominal values. When the BESS becomes fully depleted at 0% SOC, its EMS will demand a reduction in output current to zero to provide undercharge protection (UCP).

Figure 11:
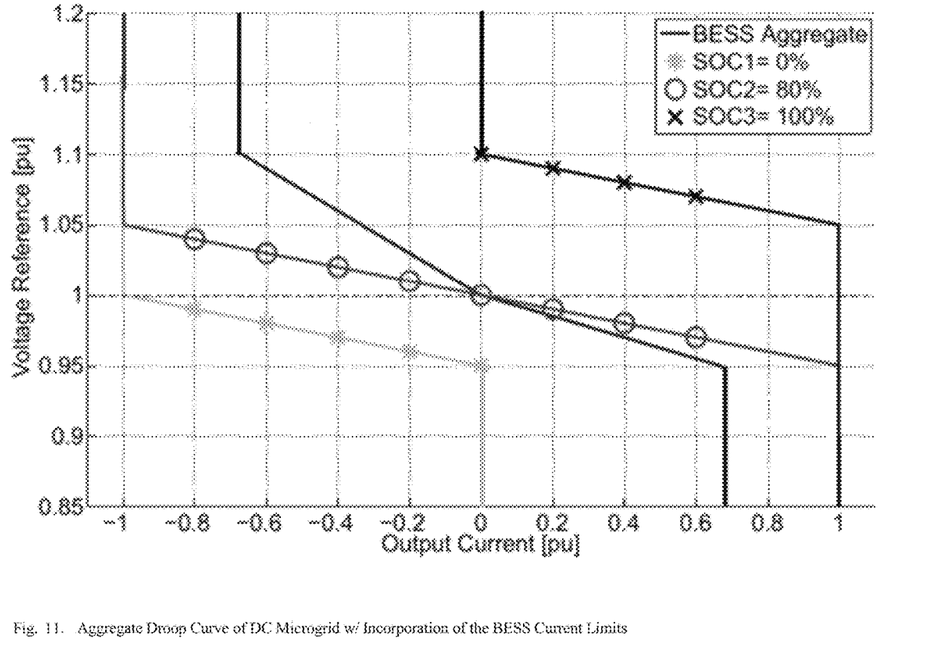
FIG. 11 illustrates the incorporation of both the UCP and OCP current limiter and how they influence the droop characteristic.

This scenario is graphically depicted in FIG. 11, where $BESS_1$ is at 0%, $BESS_3$ is at 100% and the local BMS prevents power flow to the DC microgrid. When this situation occurs, the maximum system output power in both directions is limited to the rated power of the remaining two BESSs and the aggregate curve changes as shown in FIG. 11.

It is important to note that the large state of charge difference depicted in FIG. 11 have been artificially selected for clarity of the graph and discussions. In practice, all SOC values would converge to one another shortly after system initialization. Only errors in bus voltage measurement would result in residual SOC mismatch. Based on [14], Ontario Hydro identified that their typical distribution system line losses were 0.9%. Referring to FIG. 11, this corresponds to a maximum SOC mismatch of under 15%. Even in the event one BMS curtails its $I^+_{max}$ due to lack of charge, the remaining BESSs will continue to operate. Assuming BESS units are rated for a typical 4 hours of system operation and have a typical C-rate of 1 p.u., this would imply that maximum system loading corresponds to a normalized output current of only 25% in FIG. 11. Thus, system shutdown or load shedding would occur when net output current is clipped to a value of 25% or below.

Observe that each BESS continues to define its own droop curve based on the local battery SOC and BMS current limit signals. Since this data is available locally, the energy management method continues to maintain autonomy during operation without reliance on communication of remote data.

Supervisory controls for system optimization and economic dispatch of the batteries or other non-critical functions may be readily added. However, full functionality is maintained even in absence of communication-based supervisory controls.

Simulation Results

Test Scenario 1

Figure 12:
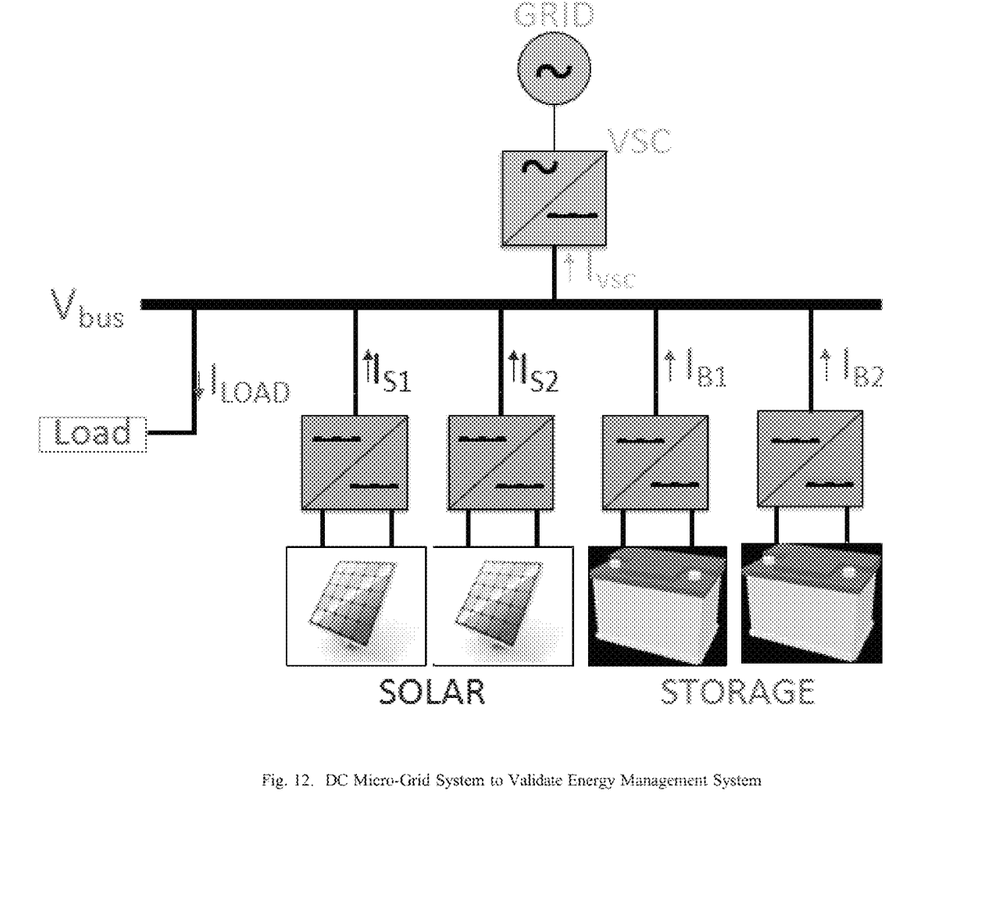
FIG. 12 is a high-level diagram of the simulated DC microgrid for testing of the method.

To validate the energy management method, the system was simulated using PSCAD™. The system consists of two BESSs, two solar PV arrays and one VSC, which is depicted in FIG. 12. Line impedances and other details are included in the model, but not depicted in FIG. 12 to enhance clarity.

The system parameters for this system are provided in Table V and use the base values in Table II. The initial conditions for the system are outlined in Table VI. It should be noted that a disproportionately small BESS capacity, Q, is employed for simulations to depict change/discharge behaviour over an accelerated time frame.

Figure 13:
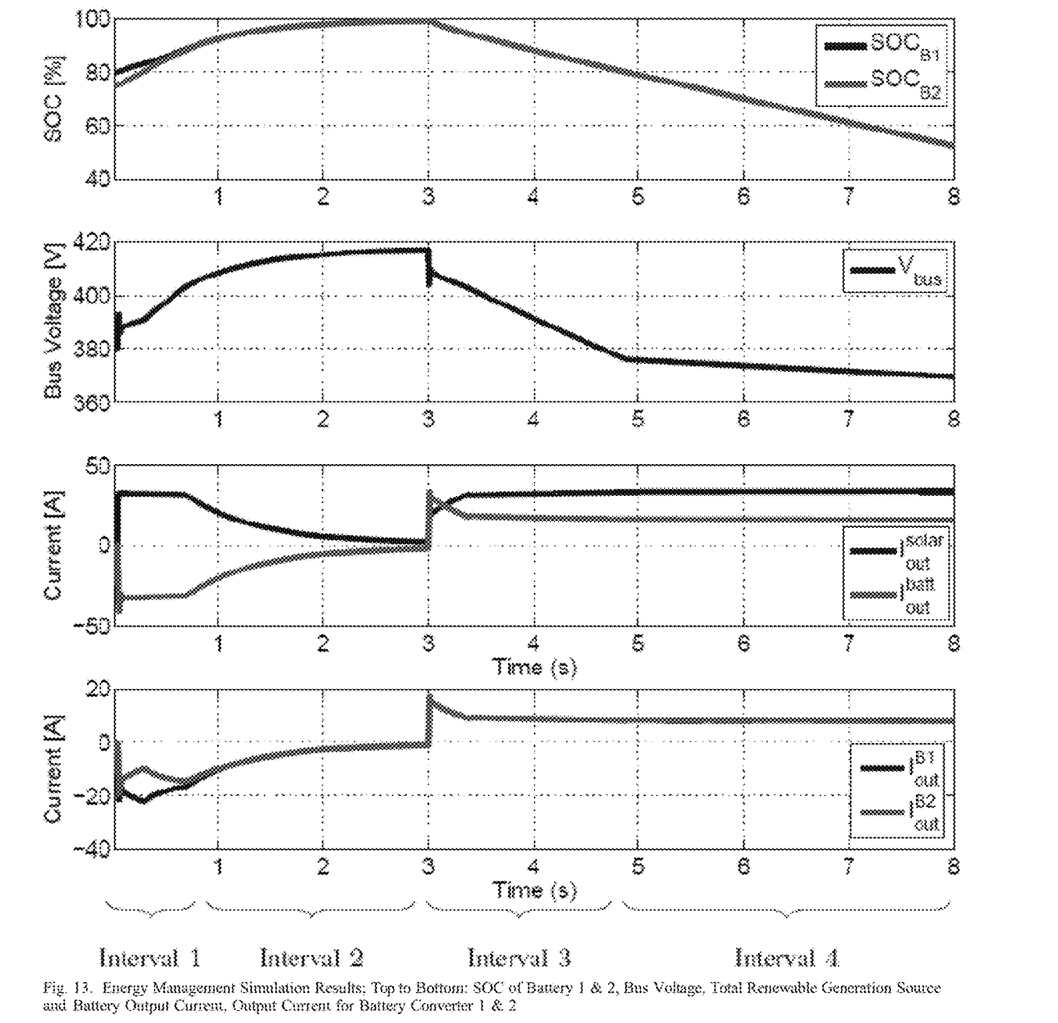
FIG. 13 is the simulation results for test scenario 1, with bus voltage and output currents measured.

The simulation results are provided in FIG. 13. During interval 1, SOC balancing occurs to correct the 5% charge difference between both BESSs. During interval 2, the overcharge protection (OCP) is activated because the bus voltage exceeds 1.05 pu (399 V). At the beginning of interval 3, a 50 A load is introduced to show the generation source's maximum permissible power steadily increase as the bus voltage drops. During interval 4, the BESS SOC is below 80% and the rate that the bus voltage changes is decreased (See FIG. 7). FIG. 13 demonstrates the energy management method meets the requirements discussed in the beginning of the chapter (SOC balancing, OCP). Therefore, the combination of vertically adjusting the droop characteristic based on SOC together with limiting the renewable generation source current offers an effective energy management method.

TABLE V

SYSTEM PARAMETERS

| Parameter | Symbol | Value |
|---|---|---|
| BESS | | |
| Rated Power | $P_{batt}^{rated}$ | 20 kW |
| Nominal Capacity | Q | 0.02 Ah |
| Droop Nominal Voltage | $V_{nom}$ | 380 V |
| Renewable Generation Source (PV) | | |
| Rated Power | $P_{rated}^{solar}$ | 8 kW |

TABLE VI

INITIAL CONDITIONS FOR SIMULATION

| Parameter | Symbol | Value |
|---|---|---|
| BESS | | |
| SOC of Battery 1 | $SOC_{B1}$ | 80% |
| SOC of Battery 2 | $SOC_{B2}$ | 75% |
| Renewable Generation Source (PV) | | |
| Irradiance | G | 900 W/m² |
| Temperature | $T_{cell}$ | 20° C. |

Test Scenario 2

Figure 14:
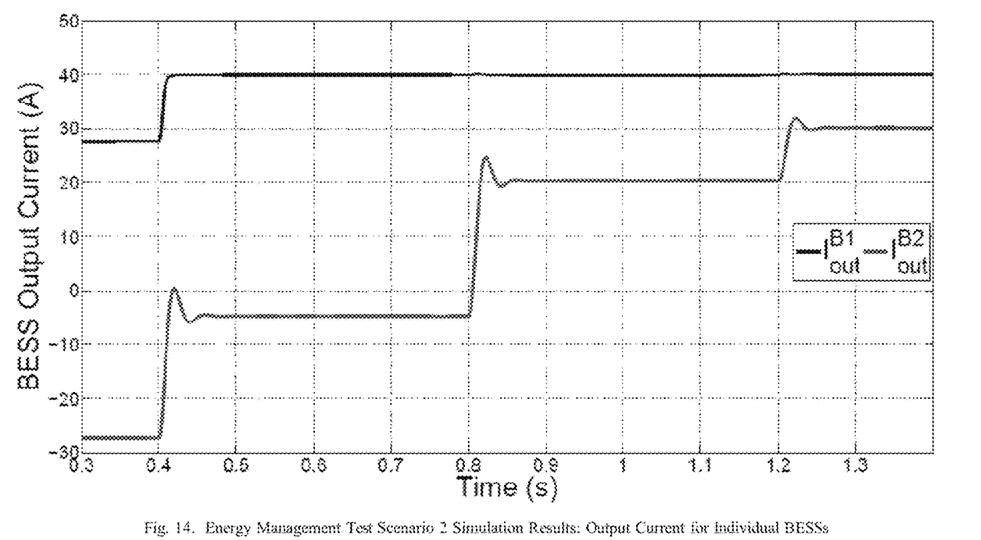
FIG. 14 is the simulation results for test scenario 2, with the BESS output currents measured.

To further demonstrate the energy management method, a scenario was created to demonstrate the current distribution of the BESS with different SOCs. The initial SOCs are outlined in Table VII and the load demand during each time interval is highlighted in Table VIII. These results are highlighted in FIG. 14. This demonstrates that the BESS with a higher SOC provides more power than the BESS with a lower SOC. This occurs until the BESS with higher SOC cannot supply more power and the BESS with a lower SOC compensates instead. This demonstrates the energy management method's ability to prioritize BESS power demands to provide SOC balancing.

TABLE VII

INITIAL SOC FOR TEST SCENARIO 2

| Parameter | Symbol | Value |
|---|---|---|
| Initial SOC: BESS 1 | $SOC_{B1}$ | 90% |
| Initial SOC: BESS 2 | $SOC_{B2}$ | 50% |

TABLE VIII

LOAD STEPS FOR TEST SCENARIO 2

| Time [s] | Load Demand [A] | Load Demand [pu] (80 A Base) |
|---|---|---|
| t > 0.4 s | 0 | 0 |
| 0.4 s < t < 0.8 s | 35 | 0.4375 |
| 0.8 s < t < 1.2 s | 60 | 0.75 |
| t > 1.2 s | 70 | 0.875 |

Offset Correction

In physically implemented systems, offsetting the bus voltage can offer many advantages (i.e. sensor error correction, line loss compensation, BESS cost optimization). For the energy management system, mismatches in the measured and actual bus voltage can reduce the effectiveness. For example, by referring to FIG. 8, a 5% sensor error can be misinterpreted as an 80% SOC mismatch, highlighting the importance of bus voltage sensing.

Conceptually, the goal of the correction method is to record the bus voltage ($V_{bus}$) measurement from all converters to calculate a statistical average. This can be done using a monitoring system with very limited or even intermittent communication bandwidth, as this action only compensates nearly static sensor offsets without closed-loop control. The difference between this average and the voltage measured by each converter is then determined and added onto the measurement as an offset. By utilizing this method, the objective is to ensure all BESSs and generation sources are measuring an identical bus voltage, where the energy management method uses this measurement as a non-critical communication signal. This offset only requires an infrequent update (~1-24 hrs), meaning that the energy management method still maintains its autonomy, and any loss of communication merely results in somewhat suboptimal SOC balancing.

The calculation for the statistical average is provided by (14).

$$\overline{V_{bus}} = \frac{\sum_{i=1}^{n}(V_{bus}^{Bi}) + \sum_{i=1}^{m} V_{bus}^{Si}}{n+m} \quad (14)$$

Figure 15:
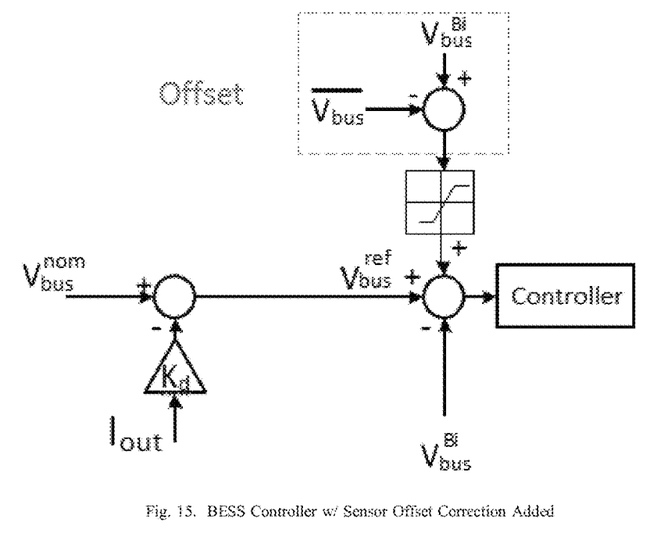
FIG. 15 is the updated controller with offset correction functionality included.

Where:
$V_{bus}^{Bi}$—The bus voltage measured by the i-th BESS
$V_{bus}^{Si}$—The bus voltage measured by the i-th generation source
n—The total number of BESSs
m—The bus voltage measured by the i-th BESS The average bus voltage, $\overline{V_{bus}}$ is then transmitted from the supervisory controller to each converter. Each local controller then calculates the difference between the average and its measurement and offsets it. This is illustrated in FIG. 15.

With this correction, all controllers see an identical bus voltage that is, on average, a more accurate measurement. This means that each local controller interprets the state of the system the same, which improves the functionality of the energy management method. This offset calculation can also be expanded to incorporate other calculations, such as line losses or BESS cost optimization, which maximizes the utilization of the offset correction in the local controller.

CONCLUSION

The energy management method provides SOC balancing, OCP, UCP and load shedding for a DC microgrid system using indirect communication between local controllers, which increases response time and reduces communication infrastructure costs. The combined SOC balancing/OCP/UCP method yields a net microgrid bus voltage that decrease in a piecewise linear manner with DC microgrid loading. Keeping the virtual resistance ($K_d$) unchanged during operation reduces eigenvalue movement, which implies that the energy management method has minimal influence on system stability. Finally, the offset correction provides a method to overcome practical limitations/optimizations of such systems. Therefore, the energy management method is applicable to all DC microgrid systems, regardless of power capacity, number of BESSs, generation sources or loads.

REFERENCES

[1] A. Engler and N. Soultanis, "Droop control in LV-grids," 2005 International Conference on Future Power Systems, Amsterdam, 2005, pp. 6 pp.-6.

[2] C. K. Sao and P. W. Lehn, "Autonomous load sharing of voltage source converters," in IEEE Transactions on Power Delivery, vol. 20, no. 2, pp. 1009-1016, April 2005.

[3] Glover, Duncan J. et al. Power System Analysis and Design. 4th Edition. Cengage Learning. 2008. pp. 577-581

[4] Kundur, P., Neal Balu J., and Mark Lauby G. Power System Stability and Control (Chapter 11 & 12). New York: McGraw-Hill, 1994. Print.

[5] Y. Ito, Y. Zhongqing and H. Akagi, "DC microgrid based distribution power generation system," The 4th International Power Electronics and Motion Control Conference, 2004. IPEMC 2004, Xi'an, 2004, pp. 1740-1745 Vol. 3

[6] S. Mane, P. Kadam, G. Lahoti, F. Kazi and N. M. Singh, "Optimal load balancing strategy for hybrid energy management system in DC microgrid with PV, fuel cell and battery storage," 2016 IEEE International Conference on Renewable Energy Research and Applications (ICRERA), Birmingham, 2016, pp. 851-856.

[7] Y. S. Bhaysar, P. V. Joshi and S. M. Akolkar, "Energy management in DC microgrid," 2015 International Conference on Energy Systems and Applications, Pune, 2015, pp. 209-213.

[8] Rui Hu and W. W. Weaver, "Dc microgrid droop control based on battery state of charge balancing," 2016 IEEE Power and Energy Conference at Illinois (PECI), Urbana, Ill., 2016, pp. 1-8.

[9] H. J. Kim, T. H. Han and B. M. Han, "Operation analysis of stand-alone DC micro-grid with coordinated droop control," 2013 IEEE ECCE Asia Downunder, Melbourne, VIC, 2013, pp. 692-698.

[10] G. Pandey, S. N. Singh, B. S. Rajpurohit and F. M. Gonzalez-longatt, "Protection and energy management of zero net electric energy clusters of buildings," 2015 IEEE Students Conference on Engineering and Systems (SCES), Allahabad, 2015, pp. 1-6.

[11] B. Wunder, L. Ott, Y. Han, J. Kaiser and M. Maerz, "Voltage Control and Stabilization of Distributed and Centralized DC Micro Grids," Proceedings of PCIM Europe 2015; International Exhibition and Conference for Power Electronics, Intelligent Motion, Renewable Energy and Energy Management, Nuremberg, Germany, 2015, pp. 1-8.

[12] Wang Panbao, Wang Wei, Xu Dianguo, Liu Guihua and Li Ming, "An autonomous control scheme for DC microgrid system," IECON 2013-39th Annual Conference of the IEEE Industrial Electronics Society, Vienna, 2013, pp. 1519-1523.

[13] North American Electric Reliability Corporation, BAL-001-TRE-1 "Primary Frequency Response in ERCOT Region" Pg. 3-4

[14] Hydro One Report, 2006 Rate Application submitted to the Ontario Energy Board, Document RP-2005-0378, Aug. 17, 2005.

What is claimed is:

1. An improved method for sharing power between multiple battery energy storage systems (BESS) connected to a common DC network having a nominal voltage
   wherein the current from each BESS is regulated based upon a voltage-current characteristic which defines an output current which increases linearly in a predetermined ratio as the measured system voltage decreases,
   the improvement comprising:
   the ratio being constant in respect of each BESS; and
   the output current of each BESS varying based upon an external signal that varies with the state of charge of the BESS.

2. The method of claim 1, wherein the ratio is constant in respect of each BESS through a real-time available power range of said each BESS.

3. The method of claim 1, wherein, in respect of each BESS, the output current is arrested outside a real-time available power range.

4. The method of claim 1 wherein the output current is proportional to the difference between a nominal voltage of the network plus a voltage offset and the measured DC voltage, wherein the voltage offset is a function of BESS state of charge.

* * * * *